United States Patent Office 3,470,114
Patented Sept. 30, 1969

3,470,114
FOAM POLYESTERS AND PROCESS OF MAKING SAME
Erhard Siggel, Seckmauern, and Walter Rein, Obernburg (Main), Germany, assignors to Vereinigte Glanzstoff-Fabriken AG, Wuppertal-Elberfeld, Germany
No Drawing. Filed Aug. 20, 1965, Ser. No. 481,418
Claims priority, application Germany, Aug. 28, 1964, V 26,665
Int. Cl. C08g 53/08, 39/10
U.S. Cl. 260—2.5          9 Claims

ABSTRACT OF THE DISCLOSURE

Process for producing a foamed polyester such as polyethlene terephthalate by reacting a homogeneous mixture of the polyester with an aromatic polycarbonate in a weight ratio of polyester to polycarbonate of 20:1 to 1:1 at a temperature and for a period of time sufficient to produce a softened foamable mass and to release carbon dioxide from the polycarbonate to act as an expanding agent. The resulting foamed products are low density, cellular materials in which the decomposed chains of the polycarbonate have reacted with the polyester.

---

This invention is concerned with foamable compositions of linear polyesters and a process by which such polyesters can be formed into a cellular product. More particularly, the invention is directed to a process for heating a homogeneous mixture of two different types of linear polyesters, one of which is a high molecular weight polycondensation product of an aromatic dicarboxylic acid with a glycol and the other of which is a high molecular weight aromatic polycarbonate, whereby an autogeneous foaming reaction takes place so as to permit the formation of a foamed or cellular polyester product.

Foamed or expanded cellular structures have been produced from a large number of synthetic thermoplastic materials which are high molecular weight polymers capable of being heated above their softening or melting point and then being resolidified after deformation into a desired shape or structure without otherwise causing any substantial changes in the polymer properties. The foamed products are adapted to many different uses because of their low specific weight or density and their cellular or porous structure, these properties being highly desirable for economic reasons or even essential in particular applications such as insulating materials.

In addition to foaming polymers, such as polystyrene or the like, prepared by addition polymerization, it is also possible to foam polymers prepared by polycondensation reactions, such as phenol-formaldehyde and urea-formaldehyde resins. In all cases, it is necessary to add a so called foaming agent or expanding agent to the polymer or the initial monomeric reactants, for example by using as the foaming agent a volatile solvent or a gas or a compound which is capable of rapidly liberating a gas under the reaction conditions.

If possible, it is usually most desirable to employ a relatively volatile liquid which can be easily dispersed in the solid polymer and which will form a gas at elevated temperatures above the melting point of the polymer so as to result in a cellular product. Such volatile solvents or liquid foaming agents are easy to use because they have a specific boiling point and a particular solvent can thus be readily adapted to the particular polymer being foamed. Also, solvents are available which are relatively inexpensive, especially when foaming or expanding addition polymers, although it may be necessary to provide means for removing obnoxious fumes.

It is also possible to entrap a gas under pressure in a thermoplastic polymer so as to cause foaming when subsequently melting the polymer. This procedure requires careful preparation of the foamable polymer in order to achieve a uniform pore size, and there is apt to be a loss of foamability by gradual escape of gas during storage.

A number of unstable compounds capable of liberating a gas at elevated temperatures have been incorporated into foamable polymers. Selection of such compounds is often quite difficult because the compound itself and its decomposition products should normally be inert to the polymer being foamed or else the unstable compound must be used in relatively small amounts which make it rather ineffective as a foaming agent. Furthermore, these gas-liberating compounds are the most expensive foaming agents because they usually have no other substantial commercial applications and therefore are not available in cheap bulk quantities. Also, the selection of any particular gas-liberating compound is complicated not only by the relatively small number available but also by the fact that they undergo decomposition at temperatures which are not suitable with respect to the melting point of the thermoplastic material being foamed.

For example, if the foaming agent decomposes to liberate or split off a gas at too low a temperature, it becomes impossible to prepare a foamable composition in the form of a solid material capable of being stored for future use, and the admixture of the foaming agent with the molten material and foaming or expansion must be carried out together. On the other hand, if decomposition of the foaming agent takes place at too high a temperature, then there is a serious danger of overheating the polymer being foamed.

In addition, some polymers react in an unsatisfactory manner with the foaming agent to cause discoloration or a substantial loss or adverse change in the desired physical and chemical properties of the foamed polymer.

Polycondensation polymers are generally more diffcult to foam, and most efforts have been directed to the foaming of the thermosetting resins such as phenol-formaldehyde or urea-formaldehyde polycondensates rather than the thermoplastic polymers such as linear polyesters of the type classified as polyterephthalic acid glycol esters. When working with the phenol-formaldehyde or urea-formaldehyde thermosetting resins, it is essential to begin with aqueous dispersions of their precondensates containing suitable expanding agents, e.g. volatile solvents or gases, in order to produce a creamy foam which rigidifies in a short period of time under the influence of heat and/or a hardening agent. Considerable storage time is then required in order to evaporate water retained in the foamed product. Needless to say, this procedure is not particularly desirable for or even generally adaptable to the foaming of thermoplastic linear polyesters.

One object of the present invention is to provide a new and improved method of foaming synthetic thermoplastic linear polyesters such as polyethylene terephthalate and its closely related modifications which have been widely used in the manufacture of synthetic filaments and films.

Another object of the invention is to provide a novel foamable linear polyester composition which can be autogeneously foamed, i.e. without the addition of special blowing agents as solvents, gases or compounds distinct from the linear polyester itself.

Still another object of the invention is to provide a foamable thermoplastic linear polyester composition which can be stored for an indefinite period and which can be economically prepared from readily available materials.

Yet another object of the invention is to provide a process for producing molded cellular products from known linear fiber-forming polyesters such as polyethylene terephthalate by means of an injection-molding machine or by extrusion into a foamed structure in the form of rods, bands or other profiled shapes.

These and many other objects and advantages of the invention will become more apparent to those skilled in this art upon consideration of the following detailed specification.

It has now been found, in accordance with the present invention, that it is possible to produce a foam polyester simply by reacting a homogeneous mixture of (A) a high molecular weight linear polyester which is a polycondensation product of an aromatic dicarboxylic acid and a glycol and (B) a high molecular weight linear aromatic polycarbonate, in a weight ratio of said polyester (A) to said polycarbonate (B) of about 20:1 to 1:1, at an elevated temperature and for a period of time sufficient to form the mixture into a softened foamable mass and to release or liberate carbon dioxide from said polycarbonate for foaming said mass. The foamable composition itself can be readily produced by simply homogeneously admixing the two components (A and (B) at a temperature above the softening point of at least one of these components, but at a sufficiently low temperature and/or a sufficiently short period of time and/or under rapid cooling of the homogenized mixture to prevent any substantial splitting-off of carbon dioxide by decomposition of the polycarbonate.

The term "softening point" is employed herein in preference to the designation of a "melting point" since linear polyesters generally do not exhibit a sharp melting point but rather a transition range of temperature at which the polyester softens and finally flows into a melt. Of course, it will be understood that there must be a sufficient degree of flow at or above the softening point to permit deformation and bubble or cell formation within the polyester mass during actual foaming. The term "high molecular weight" is used herein in the manner generally accepted for the description of synthetic polymers and especially linear polyesters which are to have a substantially solid or rigid structure at normal or room temperatures rather than a liquid or viscous substance as exhibited by relatively low molecular weight polymers. Thus, for most practical uses, linear polyesters should have a molecular weight of at least 10,000 and preferably more than about 20,000.

As the polyester component (A), it is particularly desirable to use polyethylene terephthalate because it is a readily available bulk product having widespread use as a synthetic fiber in the textile industry. However, there are many known modifications of this linear fiber-forming polyester beginning with the Whinfield et al. patent, U.S. 2,465,319, and extending up to date in which the terephthalic acid can be replaced in part by other aromatic polycarboxylic acids or even a cycloaliphatic dicarboxylic acid such as 1,4-dihydroxy-cyclohexane and in which the glycols are generally designated by the formula $$HO(CH_2)_nOH$$

where $n$ is an integer of from 2 to 10. Accordingly, such modified linear polyesters are not to be excluded from the scope of the present invention, even though it is much preferred to use polyethylene terephthalate or those modifications thereof containing not more than 15% and preferably less than 5% by weight of other acid or glycol modifiers.

The aromatic polycarbonates employed as component (B) are a well-recognized class of polymers, referred to as "aromatic polyesters of carbonic acid" by H. Schnell in his article in Angewandte Chemie, vol. 68, No. 20, pages 633–660, Oct. 21, 1956, and subsequently designated more simply by the term "aromatic polycarbonates" in the book by the same author entitled "Chemistry and Physics of Polycarbonates," Interscience Publishers, New York (1964). This book is incorporated herein by reference in order to avoid undue repetition as to the manner in which the aromatic polycarbonates are prepared, their physical and chemical properties and other detailed information concerning these polymers and their precursors. Since these aromatic polycarbonates are also linear polyesters and are being developed to some extent as stretched and crystallized fibers as well as films, it will be recognized that the compositions according to the present invention are essentially linear fiber-forming synthetic polyesters of organic dicarboxylic acids and organic dihydroxy compounds, even though each component is quite different in its chemical structure and its normal or most practical utility.

For purposes of the present invention, it is especially desirable to employ the aromatic polycarbonates which can be designated as the linear condensation products of carbonic acid with a 4,4'-dihydroxy-diphenyl-alkane, a 4,4'-dihydroxy-triphenyl-alkane or a 4,4'-dihydroxy-diphenyl-cycloalkane in which the bridging group between the hydroxy-substituted phenyl nuclei contains at least two up to about nine carbon atoms, i.e. a hydrocarbon bridging group of 2 to 9 carbon atoms which is free of aliphatic unsaturation. More particularly, the preferred aromatic polycarbonates are those linear polymers defined by the repeating or recurring structural unit of the formula

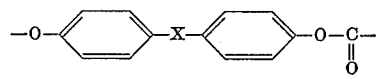

wherein X is a divalent hydrocarbon radical with a total of 2 up to about 9 carbon atoms selected from the group consisting of

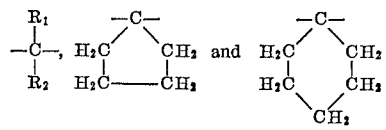

in which $R_1$ represents a member selected from the group consisting of hydrogen and lower alkyl, such as methyl, ethyl or propyl, and $R_2$ represents a member selected from the group consisting of phenyl and alkyl of 1 to 7 carbon atoms. These aromatic polycarbonates can be obtained with molecular weights from about 18,000 up to 500,000 or more, but for purposes of the present invention, it is desirable to use those polycarbonates with a range of the average molecular weight falling between about 20,000 and 250,000 and preferably between about 25,000 and 150,000.

For reasons of economy and availability, it is particularly useful to practice the present invention with the aromatic polycarbonate obtained from 4,4'-dihydroxy-diphenyl-2,2-propane, more commonly referred to as "bisphenol A" and illustrated by the following formula:

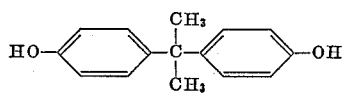

However, good results have also been achieved with the polycarbonate derived from 4,4'-dihydroxy-diphenyl-methy-phenyl-methane having the formula

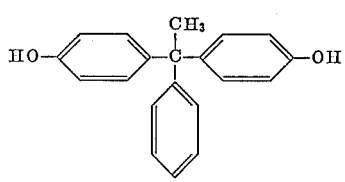

Other suitable aromatic polycarbonates for the purposes of this invention include those derived as the carbonic acid esters of the following dihydroxy aromatic compounds:

4,4'-dihydroxy-diphenyl-1,1-ethane,
4,4'-dihydroxy-diphenyl-1,1-butane,
4,4'-dihydroxy-diphenyl-1,1-isobutane,
4,4'-dihydroxy-diphenyl-1,1-cyclopentane,
4,4'-dihydroxy-diphenyl-1,1-cyclohexane,
4,4'-dihydroxy-diphenyl-phenyl-methane,
4,4'-dihydroxy-diphenyl-2,2-butane,
4,4'-dihydroxy-diphenyl-2,2-pentane,
4,4'-dihydroxy-diphenyl-2,2-hexane,
4,4'-dihydroxy-diphenyl-2,2-isohexane,
4,4'-dihydroxy-diphenyl-2,2-heptane,
4,4'-dihydroxy-diphenyl-2,2-octane,
4,4'-dihydroxy-diphenyl-2,2-nonane,
4,4'-dihydroxy-diphenyl-ethyl-phenyl-methane,
4,4'-dihydroxy-diphenyl-3,3-pentane, and
4,4'-dihydroxy-diphenyl-4,4-heptane.

The polycarbonates of these compounds, i.e., the carbonic acid polyesters prepared therefrom, can be named by attaching the prefix "poly-" and the suffix "-carbonate" to the name of the particular aromatic compound.

Although the description and working examples in this specification are directed primarily to the use of the polycarbonate of 4,4'-dihydroxy-diphenyl-2,2-propane (bisphenol A) in combination with polyethylene terephthalate as the polyester component, there is no intention to limit the invention to these two specific materials which happen to be most practical from a commercial viewpoint. All of the aromatic polycarbonates are closely related in terms of molecular structure and chemical properties with only a few exceptions, even when the phenyl nuclei are further substituted by lower alkyl, halogen, methoxy and the like or when copolymers are formed from different aromatic dihydroxy compounds. In general, it is desirable to employ those polycarbonates having a softening range below about 260° C. and preferably below 250° C.

Surprisingly, it was found that the aromatic polycarbonates and especially those listed hereinabove such as 4,4'-dihydroxy-diphenyl-2,2-propane are capable of decomposing and releasing carbon dioxide in the presence of the polyester component (A) when heated to temperatures of approximately 250° C. up to 350° C. even though these same polycarbonates alone are quite stable at these temperatures and are often processed on extrusion, casting or molding equipment without any decomposition. Thus, the aromatic polycarbonates when admixed uniformly with other linear polyesters of the polyethylene terephthalate type are capable of acting as an autogeneous foaming agent, even though the homopolymers of these carbonates require the addition of a distinct foaming agent or at least a recognizably unstable gas-liberating compound before any foaming takes place.

The chemical reaction which takes place between the polyester (A) and the polycarbonate (B) in order to release carbon dioxide as the cell-forming gas is believed to be an ester interchange which takes place more rapidly or completely with increasing temperatures and increased residence or retention time in a heating zone. Not only is carbon dioxide liberated in this reaction, but also it appears that the decomposed polycarbonate chains become installed in the macromolecule, i.e. in the linear chain, of the polyester component (A). The possibility of producing foam polyesters according to this invention is therefore based upon the concept that aromatic polycarbonates, which otherwise can be normally processed in a temperature range of between 240° C. and 350° C. without decomposition so as to form various shaped or molded articles, undergo a decomposition reaction in admixture with linear polyesters such as those obtained from glycol terephthalates with evolution of carbon dioxide and simultaneous addition of the polycarbonate residue into the linear polyester chain.

The process of foaming the homogeneous mixture of polyester (A) and polycarbonate (B), as will be apparent, can be carried out in the usual manner for thermoplastic materials containing a foaming agent which is activated at a temperature above the softening point of the material to be expanded. In general, the reaction for releasing carbon dioxide from the polycarbonate and simultaneous foaming can be carried out at temperatures above about 250° C. and preferably from about 270° C. to 350° C. in an at least partially enclosed mold, extruder or similar reaction zone. The retention time in the reaction zone can be relatively short, e.g. from about one minute up to about 15 minutes, preferably about 1.3 to 1.5 minutes at the higher temperature and about 10 to 12 minutes at the lowest temperature. Temperatures above 350° C. should ordinarily be avoided to prevent unnecessary damage to the linear polyester.

It is a particular advantage of the present invention that it is possible, especially with the preferred polyester and polycarbonate components, to produce the initial homogeneous mixture under elevated temperatures below about 270° C. and preferably less than 260° C. without causing any perceptible foaming to take place, particularly if this mixing step is carried out rapidly as in a screw extruder or similar mixing or kneading equipment, preferably with rapid cooling of the extruded mixture, e.g. in a cold water bath. For example, when homogenizing in an extruder under these milder conditions, a polycarbonate uniformly dispersed in the polyester can be extruded as rods or sheets, the cooled mixture chopped or granulated and then stored for any period of time without any danger of losing its ability to foam.

As already noted above, the weight ratio of the polyester (A) to the polycarbonate (B) can be varied within a wide range of approximately 20:1 to 1:1, since both components are soluble in one another in any mixing ratio. This offers a further advantage in that the preliminary homogenization step prior to actual foaming, as discussed above, can be accomplished at the lowest possible temperature corresponding to the lower softening range of one of the two components, since one of these components upon melting becomes a solvent for the other component. This in turn permits a much wider choice of suitable polyesters and polycarbonates in terms of monomeric components and molecular weights and a corresponding variation of the final foam polyester product in terms of its physical properties as well as the pore size of its cells.

From an economical viewpoint, a weight ratio of (A):(B) in the upper end of the range of about 20:1 may be preferred. Nevertheless, one advantage of reducing the weight ratio to the lower end of the range is that the operating temperature may usually be lowered because of a lowering of the softening range of the homogeneous mixture and/or a lowering of the temperature at which substantial amounts of carbon dioxide are released. Likewise, the density of the foamed product will tend to vary inversely with the proportion of the aromatic polycarbonate, although this density can also be controlled by the extent to which the released gas is permitted to expand under a pressure differential.

One of the preferred methods of carrying out the process of the invention consists in the use of a screw injection molding machine, since an ideal homogenization or plasticizing of the polyester-polycarbonate mixture can be achieved in the screw or worm and the production of the foam polyester as a molded article can be carried out in a single continuous operation. The same advantages are achieved by processing the mixture in an extruder with an attached injection mold. On the other hand, it is also possible to produce the foam polyester in a piston injection-molding machine, provided that the polyester-polycarbonate mixture is first homogenized in an extruder or a similar mixing device such that a prehomogenized foamable composition is obtained for subsequent use in the piston injection molding machine. Thus, the present invention provides a means of processing the linear fiber-forming polyesters such as polyethylene terephthalate into molded articles with injection-molding machines, this technique of injection molding previously having been impractical if not generally impossible with these polyesters.

The process of the invention can also be carried out by simply using an extruder without an attached injection mold. In this case, the polyester-polycarbonate mixture is homogenized and reacted for release of carbon dioxide under superatmospheric pressure in the screw or worm extruder and is then extruded or drawn off therefrom at atmospheric pressure so that the softened extruded mass rapidly foams and resolidifies into the desired extruded shape. Thus, foam polyester can be produced as rods, bands or sheets with regular or irregular profiles, depending upon the die opening of the extruder.

Conventional extrusion and injection molding apparatus can be used in these processes, and these are heated in the usual manner so as to maintain the desired homogenizing and foaming temperature of up to about 350° C., preferably above about 270° C., for the foaming reaction.

In order to achieve a uniform pore size and distribution when using the injection molding process for the production of foam polyesters according to the invention, the injection mold connected to the outlet side of the processing machine is placed under a vacuum. If the foamable thermoplastic melt is injected into a non-evacuated mold and solidified, the greater part of the carbon dioxide remains dissolved in the polyester and can be liberated or expanded therein only by subsequent tempering, e.g. at about the softening point of the polyester product. A foam product is then obtained, but the non-homogeneous pore or cell structure is much less desirable.

Therefore, it is especially desirable to evacuate the injection mold to a pressure of about 5 to 300 mm. Hg, preferably about 50 to 100 mm. Hg, and this evacuation can occur before or during the injection but preferably after the mold has been injected with the hot foamable mass so as to achieve especially uniform pores or cells. In order to obtain injection molded foamed products of different densities, it is most convenient to vary the weight of material charged into a mold of constant volume. Thus, as the weight of the charge or the "shot capacity" increases with a constant size of mold, the density of the foamed product will likewise increase with a corresponding decrease in pore size regardless of the pressure difference before and after application of a vacuum. With a sufficiently high density, it is possible to achieve a molded foamed product of the type classified as a rigid, brittle and open-celled foam structure wtih a closed outer skin or surface.

The invention is further illustrated by the following examples. Relative viscosities ($\eta_{rel}$) are measured in each case as a 1% solution in meta-cresol at 25° C.

Example 1

5 kg. of polyethylene terephthalate cuttings ($\eta_{rel}=1.63$) are mixed with 0.25 kg. of poly-(4,4'-dihydroxydiphenyl-2,2-propane)-carbonate cuttings (M.W.$\cong$30,000) and dried in a vacuum drying chamber to a water content of less than 0.05%. The homogenization of the two components is then carried out in an extruder, the cylinder temperature of which is adjusted to 265° C. The residence time of the material in the extruder is 1.3 minutes, and there is obtained a fully homogeneous, bubble-free melt in the form of a noodle or cylindrical rod which is drawn off through a water bath and is immediately granulated by conventional mechanical means. The relative viscosity of the homogenized mixture of the two components amounts to 1.61.

After drying the initial foamable material thus obtained, part of it is processed in a piston injection-molding machine. The mold cavity to be injected consists of an annular ring capable of forming a body with the following dimensions: outside diameter=70 mm., inside diameter=55 mm., wall thickness=15 mm., height=18 mm. The mold is constructed in such a way that after completion of the injection, the mold cavity can be placed under a vacuum. For this purpose, either the upper or lower half of the mold is provided with a circular, narrow suction slit which is in gaseous communication with a vacuum pump.

(a) With an average retention time of 12 minutes in the plunger cylinder, 17 g. of the molten homogeneous mixture are injected into the mold. The temperature of the molten material in the plunger cylinder is maintained at 280° C. Immediately after termination of the injection step, the mold is placed under vacuum. After a cooling time of about 1.5 minutes, tension is released and the molded article is ejected. The foamed molded ring has a density of 0.35 kg./m.$^3$ and a surface hardness Shore-D=40.

(b) Another portion of the homogenized material is injected with a temperature of the melt in the plunger cylinder of 310° C. and a charge weight or shot capacity or 27.2 g. The retention time is 8.4 minutes. The foamed molded ring has a density of 0.58 kg./m.$^3$ and a surface hardness Shore-D=60.

Example 2

5 kg. of polyethylene terephthalate cuttings ($\eta_{rel}=1.72$) are mixed with 0.5 kg of poly-(4,4'-dihydroxydiphenol-2,2-propane)-carbonate cuttings (M.W.$\cong$40,000), dried and homogenized in an extruder as described in Example 1. The resulting granulated cuttings of the homogenized mixture have a relative viscosity of $\eta_{rel}=1.72$.

The granulate thus obtained is dried, and at a temperature of the melt in the plunger cylinder of 260° or 270° C., the mixture is injected with the same apparatus as in Example 1 under the following conditions:

(a) With a charge weight of 17.0 g. and a retention time in the cylinder of the piston injection-molding machine of 12 minutes at 260° C.;

(b) With a charge weight of 23.8 g. and a retention time of 9.4 minutes in the cylinder at 270° C.

The foamed molded rings have the following properties:

(a) Density: 0.33 kg./m.$^3$
   Hardness: Shore-D=40
(b) Density: 0.48 kg./m.$^3$
   Hardness: Shore-D=55.

Example 3

5 kg. of polyethylene terephthalate cuttings ($\eta_{rel}=1.72$) are homogenized with 0.5 kg. of poly-(4,4'-dihydroxydiphenyl-methylphenyl-methane)-carbonate in the same manner as described in Example 1. The granulate thus obtained, after drying at 270° C., is injected with the same apparatus as in Example 1 under the following conditions:

(a) With a charge weight of 22.0 g. and a retention time in the cylinder of the piston injection-molding machine of 10 minutes at a temperature of 280° C.;

(b) With a charge weight of 29.6 g. and a retention time in the cylinder of the piston injection-molding machine of 8.2 minutes at 310° C.

The foamed molded rings have the following properties:

(a) Density: 0.44 kg./m.$^3$
   Hardness: Shore-D=50
(b) Density: 0.61 kg./m.$^3$
   Hardness: Shore-D=60.

Example 4

5 kg. of polyethylene terephthalate cuttings ($\eta_{rel}=1.72$) are mixed with 0.5 kg. of poly-(4,4'-dihydroxydiphenyl-2,2-propane)-carbonate (M.W.$\cong$30,000) and dried. This mixture is then put through a Troester extruder, the screw diameter of which is 40 mm. and the screw length being 20 times this diameter. The temperature of the reaction mixture within the screw extruder is maintained at 350° C. and the turning rate of the screw is adjusted such that the retention time of the molten material in the extruder is 1.3 to 1.5 minutes. The foam polyester material thus obtained is drawn off in the form of a rod or narrow band. Its density is 0.55 kg./m.$^3$.

The invention is hereby claimed as follows:

1. A process for the production of a foam polyester which comprises reacting a homogeneous mixture consisting essentially of
   (A) a high molecular weight linear polyester, which is a polycondensation product of an aromatic dicarboxylic acid and a glycol, and
   (B) a high molecular weight linear aromatic polycarbonate represented by the repeating structural unit of the formula:

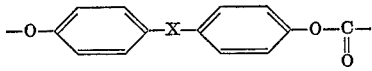

wherein X is a divalent hydrocarbon radical with a total of from 2 up to about 9 carbon atoms selected from the group consisting of

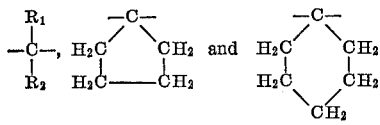

in which $R_1$ represents a member selected from the group consisting of hydrogen and lower alkyl and $R_2$ represents a member selected from the group consisting of phenyl and alkyl of 1 to 7 carbon atoms, in a weight ratio of (A):(B) of about 20:1 to 1:1, at a temperature and for a period of time sufficient to form the mixture into a softened foamable mass and to release carbon dioxide from said polycarbonate for foaming said mass.

2. A process as claimed in claim 1 wherein said homogeneous mixture is heated at a temperature of about 250° C. to 350° C.

3. A process as claimed in claim 2 wherein said polyester is polyethylene terephthalate.

4. A process as claimed in claim 3 wherein said homogeneous mixture is heated at a temperature of about 270° C. to 350° C. and under a pressure of at least one atmosphere for a period of time sufficient to release carbon dioxide, and the mixture is then molded and subjected to a lower pressure sufficient to cause the released carbon dioxide to expand and reduce the density of the molded mixture.

5. A process as claimed in claim 4 wherein the time of heating is approximately one to fifteen minutes, varying inversely with the temperature.

6. A process as claimed in claim 3 wherein said polycarbonate is poly-(4,4'-dihydroxy-diphenyl-2,2-propane)-carbonate.

7. A process as claimed in claim 3 wherein said polycarbonate is poly-(4,4'-dihydroxy-diphenyl-methyl-phenyl-methane)-carbonate.

8. A process as claimed in claim 3 wherein the initial mixture of (A) and (B) is homogenized and then heated for said reaction in an injection-molding machine and the reaction product is injected into a mold where the pressure is reduced to about 5 to 300 mm. Hg. in order to foam the softened mass.

9. A process as claimed in claim 3 wherein the initial mixture of (A) and (B) is homogenized and heated for said reaction in an extruder under superatmospheric pressure and the reaction product is extruded therefrom at atmospheric pressure in order to foam the softened mass.

References Cited

UNITED STATES PATENTS

| | | | |
|---|---|---|---|
| 2,628,945 | 2/1953 | Wayne | 260—2.5 |
| 3,218,372 | 11/1965 | Okamura et al. | 260—860 |
| 3,222,302 | 12/1965 | Böllert et al. | |
| 3,277,029 | 10/1966 | Chadwick et al. | |
| 3,290,261 | 12/1966 | Goldblum. | |
| 3,313,862 | 4/1967 | Siggel | 260—860 |

SAMUEL H. BLECH, Primary Examiner

M. FOELAK, Assistant Examiner

U.S. Cl. X.R.

260—860